Oct. 15, 1968     P. ALBERT ET AL     3,406,056
METHODS OF AND DEVICES FOR PURIFYING HIGH MELTING-POINT METALS
Filed Nov. 16, 1965

3,406,056
METHODS OF AND DEVICES FOR PURIFYING
HIGH MELTING-POINT METALS
Philippe Albert, Louis Renucci, Pierre Lehr, and Gérard Gosse, Paris, France; said Albert, said Renucci, and said Lehr assignors to Societe Anonyme Heurtey, Paris, France, and said Gosse assignor to Centre National de la Recherche Scientifique, Paris, France
Filed Nov. 16, 1965, Ser. No. 508,014
Claims priority, application France, Nov. 17, 1964, 995,267
5 Claims. (Cl. 75—84)

ABSTRACT OF THE DISCLOSURE

A method is provided for obtaining highly purified metals having high melting points and belonging to Groups IV$a$, V$a$ and VI$a$ of the periodic system of the elements. The process comprises adding to the metal to be purified a substance capable of forming a volatile oxide of the impurity to be eliminated from the metal. Primarily oxygen, carbon and silicon impurities are eliminated by adding an additive selected from the group of carbon, silicon, aluminum, a metal carbide, a metal silicide, a metal aluminide, and oxide of the metal to be purified.

---

This invention relates to the purification of metals having a high melting point and more particularly the high-degree purification of metals constituting the Groups IV$a$, V$a$ and VI$a$ of the Periodic System of the Elements, namely titanium, zirconium, hafnium, vanadium, niobium, tantalum, molybdenum and tungsten, these metals being characterized by relatively high melting points and relatively low vapor tensions at their melting points.

As already known, some of the metals pertaining to the above-mentioned groups, notably zirconium and hafnium, have a considerable range of utility in the nuclear field due to their nuclear properties in connection with the absorption of neutrons. Other metals of this series, notably titanium of which the properties are akin to those of zirconium and hafnium, are characterized by a high mechanical strength and a light weight, whereby they constitute first-class materials in aircraft construction as well as in the construction of space missiles.

However it is known that the metals pertaining to said groups, notably zirconium, hafnium and titanium, are characterized by a high oxygen solubility in the liquid state, since at room temperature the maximum solubility in $\alpha$-phase of oxygen in zirconium or hafnium is respectively 29 at. percent. Now the detrimental influence of the oxygen content dissolved in these metals on their ductility and plasticity at room temperature or at the usual temperatures at which they are machined, transformed or shaped is well known. On the other hand, when the oxygen content of these metals exceeds a certain threshold, it imparts a considerable brittleness to these metals whereby they cannot withstand any substantial mechanical stress without breaking, thus preventing any machining thereof.

Besides, the metals of the above-mentioned groups are likely to contain foreign substances liable to be considered as impurities; now, if some of these impurities, due to their considerable volatility, tend to eliminate themselves to a substantial extent during a simple melting step under vacuum or under very low pressures, from the metal involved, other impurities such as notably oxygen, carbon, silicon, etc. will not eliminate themselves, or can be removed only with difficulty during a simple melting of the metal in question, due to their physico-chemical characteristics and their affinity for the metals of the aforesaid groups.

Now, the various applications of these metals require the use of metals having a very high degree of purity.

Besides, it is known to refine these various metals by selective reaction, by causing the chemical reaction of the impurities contained in the selected metal, the products of this chemical reaction separating themselves without difficulty from the metal proper. However, it appears that the complete removal of these impurities by this process is particularly difficult. Moreover, due to the great affinity of metals from the group comprising zirconium, hafnium, titanium for oxygen, this refining method was heretofore considered as scarcely applicable to these metals. Now, in order to preserve the nuclear properties of the metals of the aforesaid groups, notably zirconium and hafnium the refining or purification processes based on the voluntary addition of suitable elements, to which these metals are subjected, must definitely not leave in the refined metal even very low contents of these addition elements capable of modifying the nuclear characteristics of this refined metal.

To avoid the risk of leaving even extremely low contents of impurities constituted by said addition elements in metals intended for nuclear, aircraft, space or like applications, it was proposed in French patent No. 1,331,472 filed on May 22, 1962, in the names of Société Générale d'Applications Electrothermiques and Centre National de la Recherche Scientifique, to refine high-melting-point metals such as zirconium and hafnium by fusing and superheating a melt thereof. In the aforesaid French patent the metal is refined by heat treatment without adding any foreign element. This method permits of eliminating the oxygen dissolved in the metal, but this removal takes place at the expenses of the treated metal since, in the case of zirconium and hafnium, for example, oxygen is eliminated in the form of volatile oxide such as ZrO or HfO, according to cases, thus causing a loss of the treated metal.

On the other hand, it was proposed in the French Patent 1,253,491 to Stauffer Chemical Co., filed on Mar. 14, 1960, to add to a mass of molten refractory metal another metal having a greater affinity for the oxygen dissolved in the refractory metal than the refractory metal itself, the volatility of this added metal being necessarily not so much higher than that of the refractory metal as to evaporate from the melt when added thereto. Moreover, this addition metal must form with the dissolved oxygen a sub-oxide more volatile than the refractory metal or the oxide or sub-oxide of this refractory metal. In this patent it is proposed more particularly to utilise zirconium, titanium, niobium and tantalum as deoxidizers of metals such as hafnium, molybdenum and tungsten. The use of carbon is strictly excluded in this patent, due notably to the risks of contaminating the treated metal which are expected by the authors of said Stauffer's patent.

Accordingly, it is the object of the present invention to provide a method of and a device for purifying high melting-point metals, which are more capable of meeting the requirements of modern techniques and actual practice than hitherto known methods and devices serving the same purposes, notably in that they effect a strong purification of the treated metals by reducing to an extremely low value the oxygen carbon and silicon contents of these metals while limiting to a minimum the loss of treated metal, by implementing means yielding better results than those obtained by resorting to hitherto known means, under economical conditions far superior to those of the prior art.

It is the object of the present invention to provide a method of purifying high melting-point metals which is characterized by the addition to the metal to be purified of a relatively low-volatile element or compound having for the oxygen dissolved in the metal to be purified, an affinity such that it can constitute therewith a volatile stable oxide easily eliminated under the treatment temperature and pressure conditions.

Advantageously, the addition element consists of carbon (for example in the form of graphite), silicon or aluminium, or a compound of these elements, such as a metal carbide, silicide or aluminide, and advantageously carbides, silicides or aluminides of hafnium, zirconium, titanium or any other metals selected according to their possibility of being completely removed of the metals to be purified, during the melting treatment.

According to a preferred provision of the present invention, the metal carbide, silicide or aluminide utilized as addition substance with a view to purify the high melting point metal contemplated are carbides, silicides or aluminides of the metal to be purified.

According to an advantageous form of embodiment of the method constituting the subject-matter of the present invention, the impurities, such as carbon, silicon, etc. contained in the high melting-point metal to be purified are removed therefrom by voluntarily adding to the metal to be purified an oxide of said metal in order to form an easily eliminable volatile oxide of the impurity to be removed.

A preferred embodiment of the method of this invention resides in the addition of the purification agent preliminary to the melting of the metal to be purified. In this case this metal is preferably in the divided form such as powder, filings, etc. and the mixture of the metal to be treated and of the purification agent may then be re-agglomerated at will to constitute a bar or tablets subseqently subjected to a melting treatment.

However, the purification agent may also advantageously be added during the melting of the metal to be treated, in the form of tablets or powder added to the liquid melt.

According to another advantageous embodiment of the method constituting the subject-matter of the present invention, the purification agent may be added by melting the metal to be treated in a crucible made from said purification agent.

The purification treatment is advantageously carried out in vacuo or at a very low pressure or, if desired, in an inert atmosphere.

This invention is also concerned with a device for carrying out the above-described method of purifying high melting-point metals. This device is characterized by the combination of a high-power pumping unit and/or a condensing device with an electron-beam furnace.

The condensing device is advantageously constituted by cooled surfaces of adequate configuration and arrangement which have the function of trapping and collecting the volatile-sub-oxides resulting from the implementing of the method of this invention.

The method of this invention is applicable not only to the purification of metals classified in Groups IV$a$, V$a$ and VI$a$ of the Periodic System of the Elements, which are prepared by using any suitable means, with a view to impart to the purified metal a particularly low residual oxygen content, but also to the purification of reclaimed metal wastes such as notably scraps, turnings, filings, etc. resulting from the machining of the metals involved, which are generally soiled and polluted by the presence of oxides, grease, etc. The purification treatment according to this invention, when applied to reclaimed metals, permits of restoring or even improving the initial characteristic properties of these metals. This is of particular interest when it is contemplated to recover very valuable alloys or metals, especially in the case of hafnium and its alloys, hafnium being, as already known, a rare metal co-existing with zirconium in natural ores having a low hafnium content, whereby costly operations are necessary for sperating this low hafnium content from zirconium and concentrating same.

In addition to the above-mentioned ones, this invention comprises other provisions as will clearly appear from the following description.

The present invention contemplates more particularly the methods of and devices for purifying high melting-point metals according to the provisions set forth hereinabove, as well as the elements necessary for carrying out these methods and embodying these devices, and the assemblies in which the methods and/or devices comprising the provisions of the present invention are incorporated.

The present invention will be better understood from the following complementary description referring to typical forms of embodiments of the method forming the subject matter thereof. Of course, it will be readily understood that these examples are given by way of illustration of the invention without limiting same in any way. Thus, more particularly, although the following examples refer only to the refining of zirconium and hafnium, it is clear that the method forming the subject-matter of this invention applies to all high melting-point metals, notably to those of Groups IV$a$, V$a$ and VI$a$ of the Periodic System of the Elements, and notably to the purification of titanium, vanadium, niobium, tantalum, molybdenum and tungsten.

EXAMPLES

*Example 1.—Deoxidizing treatment by using carbon or carbides*

The affinity of carbon for oxygen and its propensity to alloy with the oxygen dissolved in a metal melt for producing volatile oxides such as carbon monoxide CO and carbon dioxide $CO_2$ are well known. This deoxidizing process by means of carbon is conventional since it constitutes the basic reaction in cast iron and steel refining processes. However, the application of the carbon deoxidation to metals from the group consisting of zirconium, hafnium, titanium, etc. was obviously not a matter of course due to the very high affinity of these metals for oxygen.

These metals may be deoxidized by using carbon and operating at a sufficiently high temperature and a relatively low pressure, that is, in a vessel equipped with a high-output pumping unit.

(A) High-oxygen hafnium alloys and zirconium alloys are deoxidized by intimately mixing the carbon in the form of graphite powder in suitable proportion with a powder or filings of the metals to be treated, whereafter the mixture is advantageously molten in an electron-beam furnace. Thus, the liquid metal melt may be superheated to a substantial extent. The oxygen is eliminated in the form of gaseous carbon monoxide, a powerful pumping unit permitting of eliminating the oxygen as it builds up and to maintain in the vessel a residual pressure inferior to $10^{-3}$ mm. of mercury.

This treatment has made it possible to reduce the oxygen content to relatively low values without leaving any carbon dissolved in the metal. The lower limit content attainable does not depend on the concentrations of carbon and oxygen dissolved in the metal melt but on the activities of these elements therein. However, the product of the activities of the carbon and oxygen in the equilibrium condition, dissolved in the metal melt does not permit of lowering the oxygen content to zero value without leaving in the metal a certain amount of carbon that cannot be eliminated.

(B) Therefore, an alternate form of embodiment of the process described hereinabove consists in incorporating in the metal to be treated a suitable and known amount of carbon which is lower than that required for achieving a complete deoxidation. With this treatment the oxygen content is reduced to a certain lower limit, the residual carbon content being on the other hand extremely low. This residual oxygen content of the metal is then further reduced by proceeding with the melting treatment according to the method disclosed in the afore-mentioned French Patent No. 1,331,472, by removing the last traces of oxygen by means of the volatile monoxides ZrO or HfO according to the metal being treated.

(C) Another modified embodiment of the process described in paragraph A hereinabove consists in melting the metal to be treated, for example zirconium or hafnium, in vacuo at the highest possible temperature in a graphite crucible, with or without a direct complementary addition of carbon in pulverulent form to the liquid bath. Any suitable heating means may be used in this case, notably the heating of the carbon crucible in an electrical resistance furnace or in an induction furnace. The refining operation is discontinued after a predetermined time period and the ingot may be introduced into an electron bombardment furnace in the form of a small feed bar. The treatment just described is applicable more particularly to the recovery of hafnium wastes strongly contaminated by oxidation, such as for instance the chips produced when machining hafnium bars. The recovery of this strongly oxidizing material polluted by grease, is obviously economically interesting due to the high cost of hafnium.

*Example 2.—Treatment for decarburizing a metal by an oxide thereof*

The decarburizing treatment described in this example constitutes the reciprocal treatment of the one depicted in Example 1, in that a metal such as zirconium or hafnium having an undesired carbon content can be decarburized without difficulty by adding zirconium oxide $ZrO_2$ to zirconium in the molten state, or hafnium oxide $HfO_2$ if the metal to be decarburized is hafnium; the oxide is added to the molten metal in a suitable form and in an amount sufficient to either effect a complete decarburization or carry out same to the desired rate. The decarburizing treatment takes place under moderate pressure and in the same conditions as in Example 1. The oxide excess introduced for decarburizing the metal by releasing the carbon monoxide therefrom, is eliminated by applying a second treatment, consisting for example in adding to the melt a certain quantity of aluminium, thus causing the oxygen to be drawn away by forming a volatile aluminium sub-oxide which is subsequently removed through any suitable means, notably bo condensation on cooled walls of the electron-bombardment treatment furnace.

A modified form of embodiment of this treatment consists, upon completion of the desired decarburization, in eliminating the residual oxygen according to the method disclosed in the above-mentioned French Patent No. 1,331,472.

*Example 3.—Deoxidation treatment by adding silicon*

(A) Oxygen can be eliminated from hafnium according to the present invention by adding silicon to the metal either before melting same or to the molten metal in a proportion suitable for eliminating oxygen therefrom as completely as possible by resorting to a volatilization or evaporation of the silicon sub-oxide SiO the vapor tension of which is considerably higher than that of molten hafnium. The metal to be purified as well as the reducing agent utilized to this end are introduced into the treatment furnace in the form of powders, filings, granules or small bars, either together or separately, the reduction agent being molten with the metal or separately, or by contact with the metal since hafnium has a higher melting point than silicon. The deoxidation of metal by adding silicon thereto may be carried as far as desired, with due regard however for the permissible residual silicon content in the deoxidized metal. Of course, this residual silicon content depends on the specific application contemplated for the deoxidized metal and also on the desired properties and characteristics of the end product. Practical tests carried out by the applicants prove that even considerable residual amounts of silicon may be tolerated in zirconium, hafnium, titanium and the metals of this series, without impairing the malleability of the metal.

However, if it is desired to keep this residual silicon content to an extremely low value, the deoxidation may be carried out in two steps: a first melting step attended by the addition of a controlled amount of silicon, whereby the oxygen content may be reduced to a minimum value consistent with the final silicon content admitted beforehand, and then a re-melting step applied to the resulting ingot, but without any further addition, this second step being advantageously carried out in an electron-beam furnace which allows an intense superheating of the molten metal and the elimination of the residual oxygen in the form of a volatile sub-oxide of the treated metal, according to the method described in the above-mentioned French Patent No. 1,331,472.

(B) Conversely, the method according to this invention is also applicable to the elimination of any silicon constituting an impurity in the group of metals comprising hafnium, zirconium and titanium made according to any known method. As contrasted with the process described in paragraph A of this example, the silicon content of these metals may be reduced or eliminated by adding thereto, before or during the melting step, a controlled amount of an oxide of the metals involved, namely hafnium oxide ($HfO_2$), zirconium oxide ($ZrO_2$), titanium oxide ($TiO_2$) etc., according as the treated metal is respectively hafnium, zirconium or titanium, etc. The thus added oxides dissolve in the molten metal and react with the silicon which is the dissolved impurity to be eliminated, thus building therewith a volatile oxide SiO which releases from the melt and is condensing on cooled walls adequately disposed to this end and to be described further in connection with the device which also forms an object of this invention. The silicon content of these metals may be lowered to the desired final value, with due consideration however for the permissible final oxygen content allowable in the treated metal.

This final oxygen content may subsequently be reduced if desired by applying a second melting treatment to the first ingot thus obtained, without making any fresh addition, according to the method disclosed in the aforesaid French Patent No. 1,331,472, this repeated melting being advantageously carried out in an electron-beam furnace.

It is obvious that the purification method illustrated in the preceding examples is applicable as well to the elimination of any impurity likely to alloy with oxygen dissolved in the metal (or possibly voluntarily introduced under the form of an oxide addition) and to yield a volatile oxide by causing the dissolved oxygen to combine with the impurity in question, which will subsequently be eliminated by distillation during the melting of the metal to be purified.

*Example 4.—Deoxidation treatment by addition of a silicide*

Zirconium can be deoxidized by applying operative procedures similar to those already described in the preceding examples in connection with the purification of zirconium by incorporating therein or adding thereto to reducing agent such as calcium silicide or other silicides, for example silico-zirconium, which are characterized by the valuable property of being economical compounds. Zirconium deoxidation takes place substantially as in the case described in Example 3 hereinabove, the oxygen being removed from the metal melt in the form of volatile SiO which is subsequently condensed.

*Example 5.—Deoxidation treatment by addition of aluminium or an aluminium-containing compound*

(A) According to one of the most advantageous forms of embodiment of the method of this invention, hafnium (or zirconium) can be deoxidized very easily with a very high degree of efficiency by applying an electron bombardment in a melting furnace, to hafnium in any suitable form, the melt containing an addition of aluminium or an inter-metallic compound such as $ZrAl_3$ or other compounds easily prepared by bringing about the reaction in the solid state, for example at about 1,000°

C. of zirconium or hafnium with aluminium in powder form. These inter-metallic compounds are advantageous in comparison with pure aluminium in that their vapor tension is considerably lower. The $ZrAl_3$ compound cited hereinabove by way of example has a melting point approximating 1,600° C. and therefore compares favourably with aluminium in that it will not volatilize instantaneously when added to the hafnium melt. Many other compounds such as those obtained by reacting aluminium with zirconium or aluminium with hafnium may also be used. During the melting of hafnium to which aluminium or one of the above-contemplated compounds is added, the aluminium element alloys with oxygen to form in vacuo and at high temperature an aluminium sub-oxide such as $Al_2O$ or AlO, a volatile sub-oxide distilling over the melt and condensing on cool walls as in the preceding examples.

(B) If a zirconium-aluminium compound is used as a hafnium deoxidizer, it may happen that a certain amount of zirconium remains as an excess in the hafnium upon completion of the deoxidation treatment. It is known that a low zirconium content in hafnium has but negligible effects on the physical, chemical or nuclear properties of hafnium.

However, if it is required that the treated hafnium be free of zirconium from the deoxidation treatment, use may be made of a compound prepared from hafnium and aluminium as in the case of the above-mentioned zirconium and aluminium compounds.

(C) According to a modified embodiment of this example, hafnium sponge has been deoxidized by using aluminium as a reducing agent, the aluminium soaking the sponge or being added to the metal according to any suitable and known method. It should be noted that the volatility of pure aluminium, although considerably higher than that of the metal to be deoxidized, will not prevent the aluminium from acting as an efficient deoxidizer. This may be explained by the fact that the aluminium in admixture with the metal to be deoxidized, melts first and, as already set forth hereinabove, reacts with this metal to form a high intermetallic compound that cannot volatilize instantaneously before it has had time to react, as would be observed by throwing an aluminium tablet into a hafnium melt. The use of aluminium or an aluminium compound as an adjuvant for deoxidation purposes is extremely advantageous due to the fact that it is thus possible to reduce the oxygen content to a value very close to zero by using an excess of the adjuvant for, after complete deoxidation, the residual aluminium will easily eliminate itself by distilling off in the state of uncombined metal.

By applying the method constituting the subject-matter of this invention it is thus possible to reduce the oxygen content of the treated high-melting point metal to a very substantial degree in comparison with the prior art, since this content may be reduced to ten times less than the oxygen content of the purest metals of Groups IV$a$, V$a$, VI$a$, which have been obtained up to now.

The method of this invention may be carried out by using any suitable means, notably with the assistance of a device constituted by the combination of an electron bombardment furnace with a high-power pumping unit and/or a condensing device of the type described hereinafter with reference to the attached drawing, in which.

Figure 1:
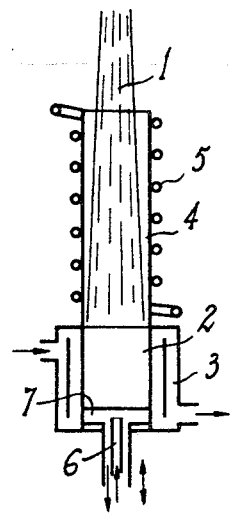
FIGURE 1 illustrates diagrammatically by way of example an arrangement comprising an electron bombardment furnace provided with means for condensing the sub-oxide or oxide released during the melt refining reaction.

Of course, the drawing and the corresponding description are given by way of example only and should not be construed as limiting the scope of the invention.

The arrangement illustrated in FIGURE 1 comprises an electron bombardment furnace consisting of an electron gun (not shown to simplify the drawing) emitting an electron beam 1 and having disposed coaxially thereto a crucible 2 cooled by causing a suitable cooling fluid to circulate in a double jacket system 3; overlying the crucible 2 in condensation hood 4 cooled by a coil 5 in which cooling fluid is circulated. The extraction piston 6 whereby the bottom wall 7 of the crucible 2 is lowered as the mass of purified metal builds up, is also cooled by circulating a cooling fluid. The condensation hood 4 constitutes the surface on which, for example, the silicon sub-oxide SiO released as described in Example 3 is caused to condense, thus permitting of maintaining in the electron bombardment furnace the vacuum necessary for its proper operation; alternately the AlO, $Al_2O$, ZrO, HfO sub-oxides resulting from the processing of one of the forms of embodiment of the method of this invention are condensed on the surface of said hood 4. This condensation process on cooled wall surfaces constitutes a typical application of the principle of cryogenic pumping.

Figure 2:
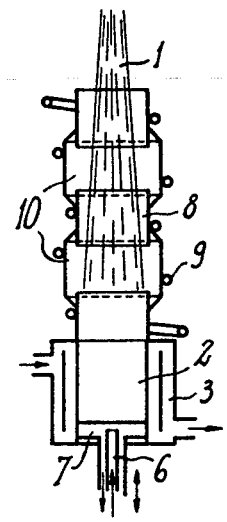
FIGURE 2 is a diagrammatic illustration of a modified form of embodiment of an electron bombardment furnace provided with condensing means and a pumping unit.

The device illustrated in FIGURE 2 comprises likewise an electron beam 1 emitted from an electron gun (not shown), a crucible 2 cooled by circulating a suitable cooling fluid, and an extraction piston 6 adapted to lower the bottom 7 of the crucible as the mass of purified metal builds up. It further comprises a condensation hood 8 cooled by circulating a suitable cooling fluid in a coil 9 and associated with a pumping unit 10 for removing the sub-oxide condensing on the walls of the condensation hood 8.

Figure 3:
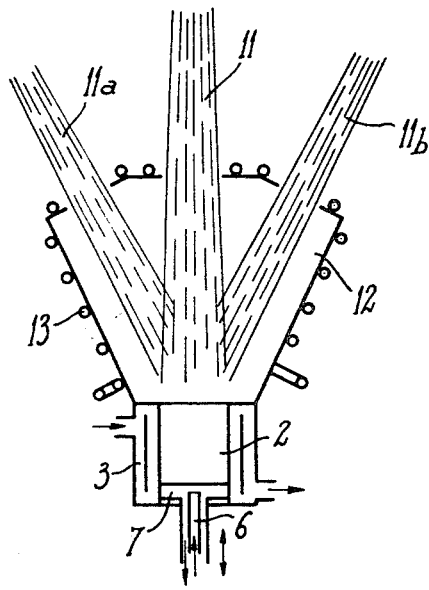
FIGURE 3 is a diagrammatic illustration of a device according to this inventioin the case of a multi-gun furnace.

The device illustrated diagrammatically in FIGURE 3 shows a typical application of the arrangements characterizing this invention to a multi-gun furnace comprising three electron beams 11, 11$a$ and 11$b$ converging to the crucible 2 surmounted by a condenser 12 of adequate shape and construction, this condenser being cooled by circulating a cooling fluid in a coil 13.

Figure 4:
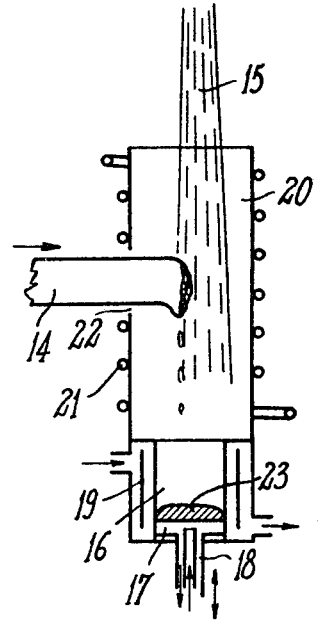
FIGURE 4 is a diagrammatic illustration of a device according to this invention which is designed more particularly for treating metal fed thereto in the form of bars.

FIGURE 4 illustrates a device constructed according to the principles of the present invention but adapted to such cases wherein the metal to be treated is fed to the electron bombardment furnace in the form of a solid bar in lieu of the pulverulent form as described in the crucible-type furnace of FIGURES 1 to 3.

The metal to be treated, to which the refining metal has possibly been added prior to the agglomeration step, is fed to the furnace in the form of a feed bar 14 of which the free end is kept across the path of the electron beam 15 through any suitable means and notably with the assistance of a feed device (not shown) capable of impressing simultaneously a movement of translation and a movement of rotation about its axis to said bar, said electron beam causing the metal to melt and flow in this state into the ingot mold 16. This ingot mold 16 may advantageously be of the deep type described in the above-mentioned French Patent No. 1,331,472. It comprises a movable bottom 17 mounted on an extraction piston 18 descending as the purified ingot 23 is formed. The ingot mold 16 is cooled by circulating a suitable fluid in a double-jacket system 19. Overlying this double-jacket system is a condenser 20 consisting of a hood cooled by circulating fluid in a coil 21, an aperture 22 being formed in the wall of this hood to permit the passage of the fed bar 14. The sub-oxide released during the purification reaction is condensed on the inner wall of the condensation casing 20 and removed therefrom through any suitable means, notably with the assistance of a high-output pumping unit.

The melting temperatures vary according to the nature of the treated metal from about 2,000° to about 3,000° C. The purification treatment is advantageously applied by maintaining in the crucible or the ingot mold a low pressure of the order of $10^{-5}$ to $10^{-6}$ mm. of mercury, and in any case a pressure inferior to $10^{-3}$ mm. Hg.

From the foregoing it is clear that, irrespective of the specific form of carrying out the invention and the specific application thereof, a method of and a device for purifying high-melting point metals are obtained whereby end products having a higher degree of purity than that hitherto attainable with prior art arrangements can be prepared, thus widening considerably the field of application of the metals contemplated, more particularly those of Groups IVa Va and VIa of the Periodic System of the Elements.

The method and device of this invention for purifying high-melting point metals are characterized by substantial advantages over hitherto known methods and devices, notably in that the purified metal obtained by using said method and device has practically zero oxygen content and is therefore on the one hand considerably less brittle than metals of the same type obtained with hitherto known methods and devices, and on the other hand much more malleable and ductile than said metals.

As will be easily understood from the foregoing, this invention should not be construed as being limited to the specific forms of embodiment and examples described more particularly hereinabove, since many modifications and variations may be brought thereto without departing from the spirit and scope of the invention.

What we claim is:

1. A method for obtaining highly purified metals of high boiling point and belonging to Groups IVa, Va and VIa of the periodic classification of the elements, consisting of combining the metal to be purified and a carbide of said metal to be purified, subjecting the mixture obtained to purification treatment in an electronic bombardment furnace operating at a temperature between 2,000 and 3,000° C. and under a pressure of $10^{-5}$ to $10^{-6}$ mm. of mercury, and recovering the highly purified metal.

2. A method for obtaining highly purified metals of high boiling point and belonging to Groups IVa, Va and VIa of the periodic classification of the elements, consisting of combining the metals to be purified with an oxide of the said metal to be purified in such amounts so as to remove substantially all of the impurities contained therein, subjecting the mixture to purification treatment in an electronic bombardment furnace operating at a temperature between 2,000 and 3,000° C. and under a pressure of $10^{-5}$ to $10^{-6}$ mm. mercury, and recovering the highly purified metal.

3. A method according to claim 2 consisting of the additional step of eliminating excess oxide contained in the purified metal by adding aluminum to the purified metal and subjecting the thus-obtained mixture to a purification treatment in an electronic bombardment furnace in order to form volatile sub-oxide of aluminum and subsequently recovering the highly purified metal.

4. A method according to claim 2 comprising combining the purified metal with calcium silicide and subjecting the thus-obtained mixture to purification treatment in an electronic bombardment furnace and subsequently recovering the purified metal.

5. In a method for the removal of oxygen from high melting point metals belonging to Groups IVa, Va and VIa of the periodic classification of the elements comprising admixing such metals with a purification additive and subjecting such admixture to purification treatment, the improvement according to which the purification treatment is carried out in an electronic bombardment furnace at a temperature between 2,000 and 3,000 C. and at a pressure of $10^{-5}$ to $10^{-6}$ mm. of mercury and the purification additive is an inter-metallic compound of aluminum.

References Cited

UNITED STATES PATENTS

| 2,848,315 | 8/1958 | Kieffer et al. | 75—84 X |
| 3,084,037 | 4/1963 | Smith | 75—84 X |
| 3,091,525 | 5/1963 | Hunt | 75—84 |
| 3,107,165 | 10/1963 | Ham et al. | 75—84 X |
| 3,132,024 | 5/1964 | Matricardi | 75—84 |
| 3,288,593 | 11/1966 | Smith et al. | 75—84 |
| 3,288,594 | 11/1966 | Smith | 74—84 |
| 3,330,646 | 7/1967 | Heinen et al. | 75—84 |

CARL D. QUARFORTH, *Primary Examiner.*

M. J. SCOLNICK, *Assistant Examiner.*